(12) United States Patent
Richter et al.

(10) Patent No.: US 9,460,180 B2
(45) Date of Patent: Oct. 4, 2016

(54) DATA PULLS

(71) Applicants: Matthias Richter, Sinsheim (DE);
Thomas Moser, Wiesloch (DE);
Martin Schneiders, Walldorf (DE);
Gisella Dominguez Anzuinelli,
Schwetzingen (DE); **Mathias
Schoenecker**, Hambruecken (DE);
Gunilla Carbol, Karlsruhe (DE);
Lorenz Pfeil, Walldorf (DE); **Frank
Schuhmacher**, Louisville, KY (US)

(72) Inventors: Matthias Richter, Sinsheim (DE);
Thomas Moser, Wiesloch (DE);
Martin Schneiders, Walldorf (DE);
Gisella Dominguez Anzuinelli,
Schwetzingen (DE); **Mathias
Schoenecker**, Hambruecken (DE);
Gunilla Carbol, Karlsruhe (DE);
Lorenz Pfeil, Walldorf (DE); **Frank
Schuhmacher**, Louisville, KY (US)

(73) Assignee: SAP SE, Walldorf (DE)

( * ) Notice: Subject to any disclaimer, the term of this patent is extended or adjusted under 35 U.S.C. 154(b) by 253 days.

(21) Appl. No.: 14/170,439

(22) Filed: Jan. 31, 2014

(65) Prior Publication Data

US 2015/0220610 A1 Aug. 6, 2015

(51) Int. Cl.
*G06F 17/30* (2006.01)

(52) U.S. Cl.
CPC ... *G06F 17/30575* (2013.01); *G06F 17/30174* (2013.01); *G06F 17/30864* (2013.01)

(58) Field of Classification Search
CPC ............. G06F 17/30575; G06F 21/6218; G06F 9/466; G06F 17/30356; G06F 17/30864; G06F 17/30174; G06F 13/1689; Y10S 707/9994
USPC .......................................................... 707/623
See application file for complete search history.

(56) References Cited

U.S. PATENT DOCUMENTS

| | | | | |
|---|---|---|---|---|
| 5,313,462 A * | 5/1994 | Fujino | .................. | H04J 3/0605 358/409 |
| 6,763,428 B1 * | 7/2004 | Cappon | ............. | G06F 17/30067 360/47 |
| 6,983,236 B1 * | 1/2006 | Karlovac | ........... | G06Q 30/0603 703/22 |
| 7,447,709 B1 * | 11/2008 | Rozenman | ........ | G06F 17/30415 |
| 7,627,658 B2 * | 12/2009 | Levett | ...................... | G06F 9/46 709/203 |
| 7,653,668 B1 * | 1/2010 | Shelat | ................. | G06F 11/2094 707/610 |
| 8,290,919 B1 * | 10/2012 | Kelly | .................... | G06F 17/302 707/698 |
| 8,458,127 B1 * | 6/2013 | Lorch, III | ........ | G06F 17/30174 707/617 |
| 8,462,821 B1 * | 6/2013 | Sagarwala | ............ | H04J 3/0667 370/503 |
| 9,053,073 B1 * | 6/2015 | Subramanian | ...... | G06F 11/2064 |
| 9,146,656 B1 * | 9/2015 | Srinivasan | ............ | G06F 3/0482 |
| 2003/0145021 A1 * | 7/2003 | Parkkinen | ........ | G06F 17/30575 |
| 2003/0200480 A1 * | 10/2003 | Beattie | ................ | G06F 11/1456 714/13 |

(Continued)

*Primary Examiner* — Thanh-Ha Dang
(74) *Attorney, Agent, or Firm* — Mintz Levin Cohn Ferris Glovsky and Popeo, P.C.

(57) ABSTRACT

Methods and apparatus, including computer program products, are provided for data pulls. In some implementations, a method may be provided which includes accessing an object to determine whether a prior pull request is at least one of an a restricted type or an unrestricted type; generating, when the prior pull request is determined to be of the unrestricted type and successful, a pull request including a time stamp obtained from the object; generating, when the prior pull request is determined to be at least one of the restricted type or unsuccessful, a pull request including at least one of a selection criteria and another time stamp obtained from the object, the other time stamp representing a prior successful pull request; sending, by a first processor, the generated pull request to a second processor having master data to obtain an update to data at the first processor.

26 Claims, 5 Drawing Sheets

(56) References Cited

U.S. PATENT DOCUMENTS

| | | | | |
|---|---|---|---|---|
| 2004/0243617 | A1* | 12/2004 | Bayyapu | H04L 67/325 |
| 2004/0260873 | A1* | 12/2004 | Watanabe | G06F 11/2058 711/114 |
| 2005/0183114 | A1* | 8/2005 | Lupoi | H04H 60/33 725/35 |
| 2006/0048217 | A1* | 3/2006 | Watkins | H04L 67/2833 726/11 |
| 2007/0106739 | A1* | 5/2007 | Clark | H04L 12/587 709/206 |
| 2007/0208834 | A1* | 9/2007 | Nanamura | G06F 9/46 709/220 |
| 2008/0154983 | A1* | 6/2008 | Lee | G06F 17/2288 |
| 2008/0256177 | A1* | 10/2008 | Boberg | H04L 67/1095 709/203 |
| 2009/0138870 | A1* | 5/2009 | Shahindoust | G06F 8/65 717/172 |
| 2009/0147806 | A1* | 6/2009 | Brueckheimer | H04J 3/0667 370/503 |
| 2011/0276489 | A1* | 11/2011 | Larkin | G06Q 20/20 705/44 |
| 2013/0084896 | A1* | 4/2013 | Barkie | H04W 12/02 455/466 |
| 2013/0111003 | A1* | 5/2013 | Burckart | H04L 67/26 709/223 |
| 2013/0132828 | A1* | 5/2013 | Qu | G06Q 10/10 715/243 |
| 2013/0304694 | A1* | 11/2013 | Barreto | G06F 17/30283 707/608 |
| 2014/0106727 | A1* | 4/2014 | Velusamy | H04W 4/001 455/418 |
| 2014/0357234 | A1* | 12/2014 | Sullivan | H04W 4/06 455/412.1 |
| 2015/0011210 | A1* | 1/2015 | Drevon | H04W 8/10 455/435.2 |
| 2015/0019654 | A1* | 1/2015 | Wheeler | H04L 51/24 709/206 |
| 2015/0106333 | A1* | 4/2015 | Barker | G06F 17/20722 707/638 |

\* cited by examiner

DATA PULLS

FIELD

The present disclosure generally relates to database processing and, in particular, data synchronization.

BACKGROUND

Today, businesses rely on business enterprise resource planning ("ERP") and other types of business systems to assist them in performing various tasks as well as allowing them to run smoothly. The day-to-day operations may include a multitude of tasks such as purchasing, selling, distribution, payroll, accounting, benefits, security, maintenance, and various other tasks that businesses need to stay afloat in a dynamic marketplace. These systems, solutions, and other software that may perform these tasks may come from different vendors and/or designed using different computing platforms, frameworks, and the like (for example, programming languages, operating environments, etc.). As such, in order for businesses to have full and uninterrupted uses of all of their ERP systems, solutions, and other software, it is desirable that such ERP systems, solutions, and other software be compatible with one another

SUMMARY

Methods and apparatus, including computer program products, are provided for data pulls.

In some implementations, a method may be provided which includes accessing an object to determine whether a prior pull request is at least one of an a restricted type or an unrestricted type; generating, when the prior pull request is determined to be of the unrestricted type and successful, a pull request including a time stamp obtained from the object; generating, when the prior pull request is determined to be at least one of the restricted type or unsuccessful, a pull request including at least one of a selection criteria and another time stamp obtained from the object, the other time stamp representing a prior successful pull request; sending, by a first processor, the generated pull request to a second processor having master data to obtain an update to data at the first processor.

In some implementations, the above-noted aspects may further include additional features described herein including one or more of the following. The master data may be stored at a database. The second processor may not provide notifications to the first processor when the master data is updated. The object may include status information for one or more prior pull requests, time information for one or more prior pull requests, error information for one or more prior pull requests, and query information to enable a query of the second processor having master data. The object may include an administrative node linked to a query node. The object may include an administrative node, wherein the administrative node includes a time when the first processor was last updated successfully by the master data at the second processor, an indication of whether one or more prior pull requests failed, one or more unrestricted indicators, and one or more restricted indicators. At least one of the unrestricted indicators may represent whether the prior pull request was configured to obtain all data from master data. At least one of the restricted indicators may represent whether the prior pull request was configured to obtain only updates to master data. The object may be updated based on the received update. A pull controller may include at least one processor circuitry and at least one memory circuitry configured to cause the accessing, the generating, and the sending.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Like labels are used to refer to same or similar items in the drawings.

DETAILED DESCRIPTION

When systems are integrated, a first system may have data, such as master data and the like, that may be required by another system. When this is the case, the first, sender system (which is considered to own or control the master data) may send a push notification to the second, receiver system to notify the second system that master data is available (or has been updated) for the second system. Although push notifications work in certain frameworks, more loosely coupled frameworks may not mandate push notification support at the sender system.

The subject matter disclosed herein relates to a pull mechanism at the receiver system. This pull mechanism may be configured to allow the receiver system to obtain data from the sender system, when the sender system does not support push notifications. Moreover, there may be provided a pull mechanism configured to guarantee that all changed data has been received from the first, sender system. For example, a guarantee may be provided via an error indicator and a time stamp for the last successful push call, such that the updated data is actually provided, received, and stored at the receiver system. Moreover, there may be provided a pull mechanism configured to enable monitoring of pull requests, error indicators, time stamps, and any issues associated with the pull requests.

Figure 1:
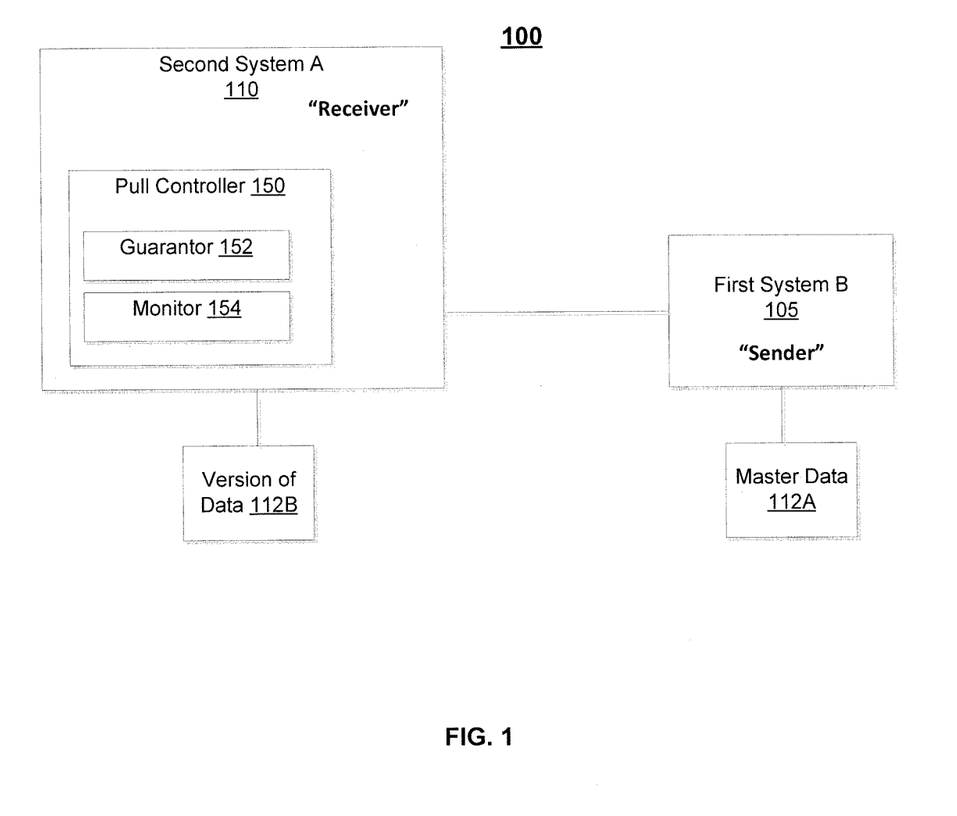
FIG. 1 depicts an example of a system for pulling data, in accordance with some example implementations.

FIG. 1 depicts an example system 100 including a first system 105 including data, such as master data 112A and the like, under the control of the first system 105. System 105 may be coupled (for example, via a link, such as a network, the Internet, and/or any other communication media) to a second system 110.

The second system 110 may include a pull controller 150, which couples to first system 105 in order to pull some, if not all, of the data 112A (labeled master data) from the first system 105 to the second system 110, so that a version of the data 112B can be used by second system 110.

For example, first system 105 may be a source of master data, which is under the control of the first system 105. To further illustrate, first system 105 may be a database including master data, such as personnel data, financial data, sales data, and/or any other data, under the control of first system 105. The database may be implemented as a relational database management system, a column-stored database, an in-memory database, or any other type of database.

The second system 110 may need some of the master data owned by the first system 105, but the first system 105 may not be configured to send push notifications. As such, second system 110 does not receive push notices indicating updates to the master data caused by changes to the master data at first system 105. These changes to the master data may be caused by creation/arrival of data, deletions, updates, and/or any other changes to the master data. The second system 110, even if initially loaded with a copy of the master data from first system 105, may not have, as data 112A changes, an accurate copy or version at 112B unless pull controller 150 pulls data including updates from first system 105/master data 112A to the second system 110/version of data 112B. For example, pull controller 150 may send a pull request (also referred to as a pull call) to first system 105. This pull request may enable first system 105 to query for (or otherwise identify) data and then send any corresponding data to the second system 110, where it can be stored as data 112B.

The pull controller 150 may also include a guarantor 152 configured to guarantee that all updates at first system 105 have been received and saved to second system 110. For example, a guarantor 152 may track pull requests sent by second system 110 to the first system 105, and then track the fulfillment of the requests to ensure the fulfillment. The pull controller 150 may also include a monitor 154 to monitor the status of pull requests (for example, whether the pull requests have been completed successfully, whether any errors occurred during execution of the pull request, and the like).

In some example implementations, pull controller 150 may be provided as a pull service, which can be called by another service including an application at for example second system 110. This pull service may utilize one or more objects for storing pull requests and/or metadata associated with the pull request (for example, status of a given pull request, time information associate with the request, error indicators, and any other request type of information).

Figure 2:
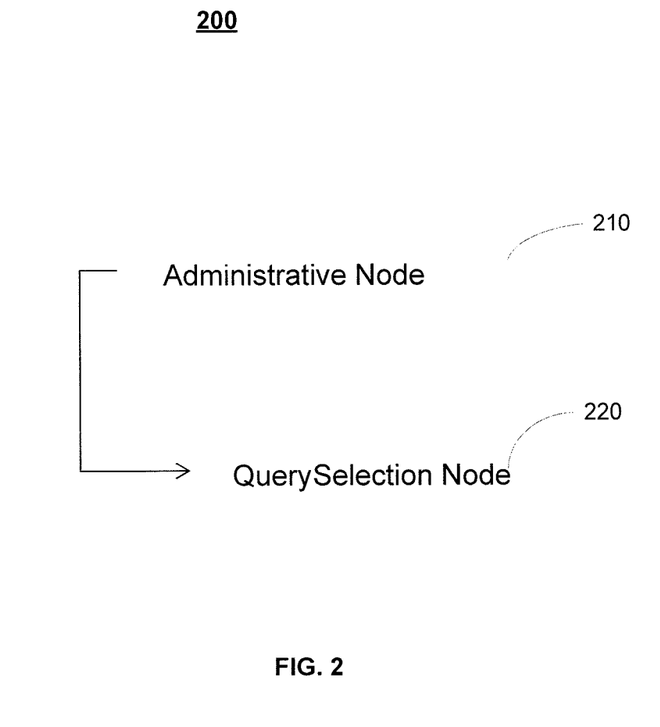
FIG. 2 depicts an example of an object for pulling data, in accordance with some example implementations.

FIG. 2 depicts an example an object, such as a business object 200. The business object 200 may include an administrative portion, such as an administrative node 210, and a query selection portion, such as a query selection node 220. The administrative node 210 may store metadata related to the administration of the pull request sent to the first system 105 where the master data is located. Examples of the metadata that may be included in the administrative node 210 comprise one or more of the following: a snapshot date and time, an error flag, an unrestricted indicator, a create/update user, create/change time stamp, and the like.

The snapshot date and time field may store a date and/or time when the last pull request was processed to serve as an update to data 112B at the system 110. Thus, the snapshot date and time field represents the version of the data at 112B.

The error field may indicate whether a pull request failed. For example, a pull request that does not result in a successful update of data 112B at the system 110 may be considered a failure, and thus trigger flagging the error field. This enables pull controller 150 to assess what version of data is present at data 112B, when making further pull requests to system 105 including master data 112A. Errors may occur for a variety of reasons including unavailable system 105, an unauthorized/wrong user, a password error, a connectivity failure/problem, a data inconsistency at system 105, and the like.

The unrestricted indicator may show whether a pull request is an unrestricted type of pull. The term "unrestricted" refers to a pull that obtains all data 112A from first system 105 since the last unrestricted call. For example, all data at master data 112A that has been updated in any way after the snapshot date and time field of a pull request may be retrieved from master data 112A and sent to the second system 110/data 112B.

Although the pull controller 150 may trigger request, a user may request that the pull controller trigger a pull request as well. Moreover, some of the information in the administrative node or query selection node may be generated by system 105. For example, the create or change timestamp associated with the data may be generated/provided by system 105.

In some implementation, there is provided a link to an application log. The application log may include some, if not, all of the error and/or warning messages occurring during a pull request. These errors may include for example an indication that a system which receives the pull request is not responsive, available, and/or at a given location; a pull request being triggered with a wrong user or password; an connection being unavailable to the system having the master data; and/or inconsistencies at system 105 (which receives the pull request).

The query selection node 220 may include one or more selection criteria for a query performed at the first system 105 to obtain data in response to a pull request. For example, selection criteria may include one or more items that can be retrieved from master data 112A and, in some instances, may be use-case specific. To illustrate further with a personnel/employee business system example, the selection criteria may request data for a specific employee having an employee identifier (ID) of "XYZ," rather than requesting all data being updated after the date and time stamp field. In this example, system 105 responds to the pull request by querying master data 112A for data related to employee identifier (ID) of "XYZ" and then sending the retrieved data to second system 110/data 112B, synchronizing thus the data at systems 110 and 105 at least with respect to for example employee XYZ. In some implementations, the query selection node 220 is only used during a restricted pull request. The restricted pull request represents a pull request that is specific to a certain selection criteria and thus not unrestricted. The previous example of a query for updates from master data 112A related to employee XYZ is an example of a restricted pull request as this request is "restricted" to a specific query selection criteria.

Figure 3:
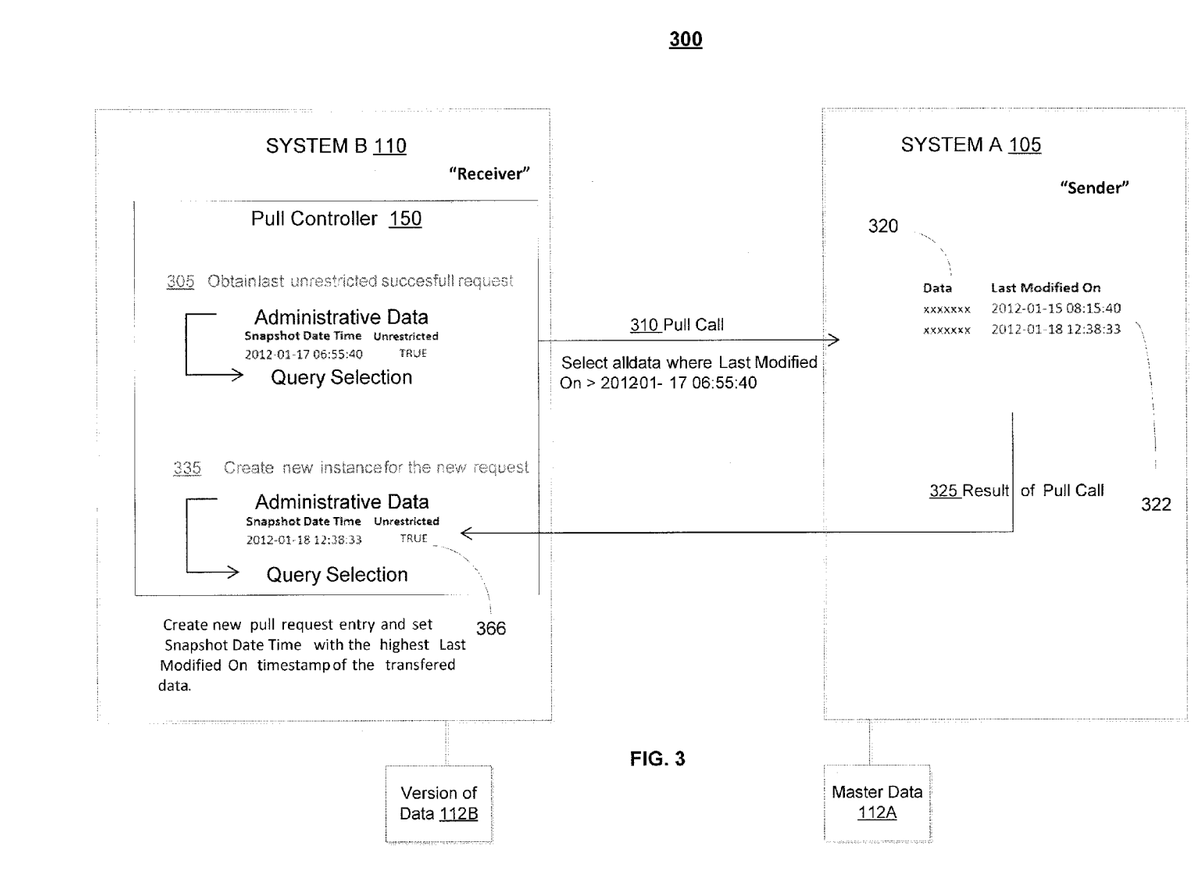
FIG. 3 depicts an example of a data pull process, in accordance with some example implementations.

FIG. 3 depicts an example of a pull request process 300, in accordance with some example implementations.

In some example implementations, pull controller 150 may be configured to allow the second, receiver system 110 to pull data from first, sender system 105 including data 112A. This data 112A may, as noted, be considered master data, which may be updated from time to time.

The pull controller 150 may also include a scheduler configured to trigger at one or more times a pull request for data at first system 105/master data 112A. For example, the scheduler may trigger one or more times based on a schedule that is predetermined and/or configurable (for example, by an end-user, developer, and/or the like) to enable obtaining updates for second system 110/data 112B. Although a schedule may be used, the pull request may be triggered by events as well.

The pull controller 150 may also monitor for errors that may occur during the pull request process 300. For example, link errors, unavailable system 105 errors, and the like may trigger an error, which can be logged by pull controller 150.

The pull controller 150 may also implement one or more objects, such as object 200. For example, object 200 may be implemented as a business object including administrative information and/or query information structured as noted with respect to FIG. 2. For example, pull controller 150 may obtain data, such as master data, from system 105 based on the business object defining the snapshot date time, whether the query is restricted or unrestricted, selection criteria, and so forth.

At 305, pull controller 150 may access business object 200 to determine for example the last successful unrestricted pull request to obtain an update from first system 105 including master data 112A. In some implementations, pull controller 150 accesses the "snapshot date time" field of the business object 200 and the unrestricted field (which in this example corresponds to "TRUE" indicating that the pull request at "2012-01-17 06:55:40" was unrestricted). In this example, an unrestricted pull request would obtain data from first system 105/master data 112A with a last modified value on or after "2012-01-17 06:55:40" and provide that data as an update to data 112B at second system 110.

At 310, pull controller 150 may send the pull request as a pull call. The pull call in the example of FIG. 3 includes the snapshot date time timestamp to indicate that all master data 112A that has a last modified value on or after "2012-01-17 06:55:40" should be retrieved from master data 112A and provided to system 110/data 112B in response to the pull request. The pull call/request may take the form of a query of a database having master data. This query may obtain all master data 112A that has a last modified value on or after "2012-01-17 06:55:40. The formation of the query may be performed by pull controller 150, although system 105 may form the query as well based on the contents of the pull call/request. For example, the system 105 may be configured to recognize that a pull request/call including an unrestricted pull request indicator and/or a time stamp represents a request for all master data 112A that has a last modified value on or after the time stamp value.

At 320, system 105 may retrieve from master data 112A any data that was last modified (for example, updated, revised, created, saved, and/or the like) on or after the snapshot date time timestamp provided in pull call 310. In the example of FIG. 3, only a single data item 322 satisfies this requirement.

At 325, the results of the retrieval are sent to system 110 including pull controller 150. When received at system 110, the data is stored at 112B, which synchronizes data 112B with master data 112A. Moreover, pull controller 150 may create or update the business object at 335, so that the snapshot date time reflects the time associated with the received data. In the example of FIG. 3, the data received at 325 has a snapshot date time of "2012-01-18 12:38:33" (see, e.g., 322 and 366). As such, a subsequent unrestricted pull request would seek data from first system 105/master data 112A having a last modified value on or after "2012-01-18 12:38:33."

Although the previous example describes an unrestricted pull request, the pull request sent at 310 may also be restricted. For example, the pull request may include specific search criteria, such as an employee ID and/or any other value. When that is the case, first system 105 may respond at 325 with the retrieved data, such as the data for the employee having a certain ID.

If the pull request is triggered with a snapshot date time timestamp and without selection restriction but a prior pull request was not successful (for example, system 105 is not available, does not respond, and/or the like), pull controller 150 may ignore the snapshot date time timestamp of the unsuccessful pull request on a subsequent pull request (and/or instead use a snapshot date time timestamp of the last successful pull request when making the subsequent request).

Figure 4:
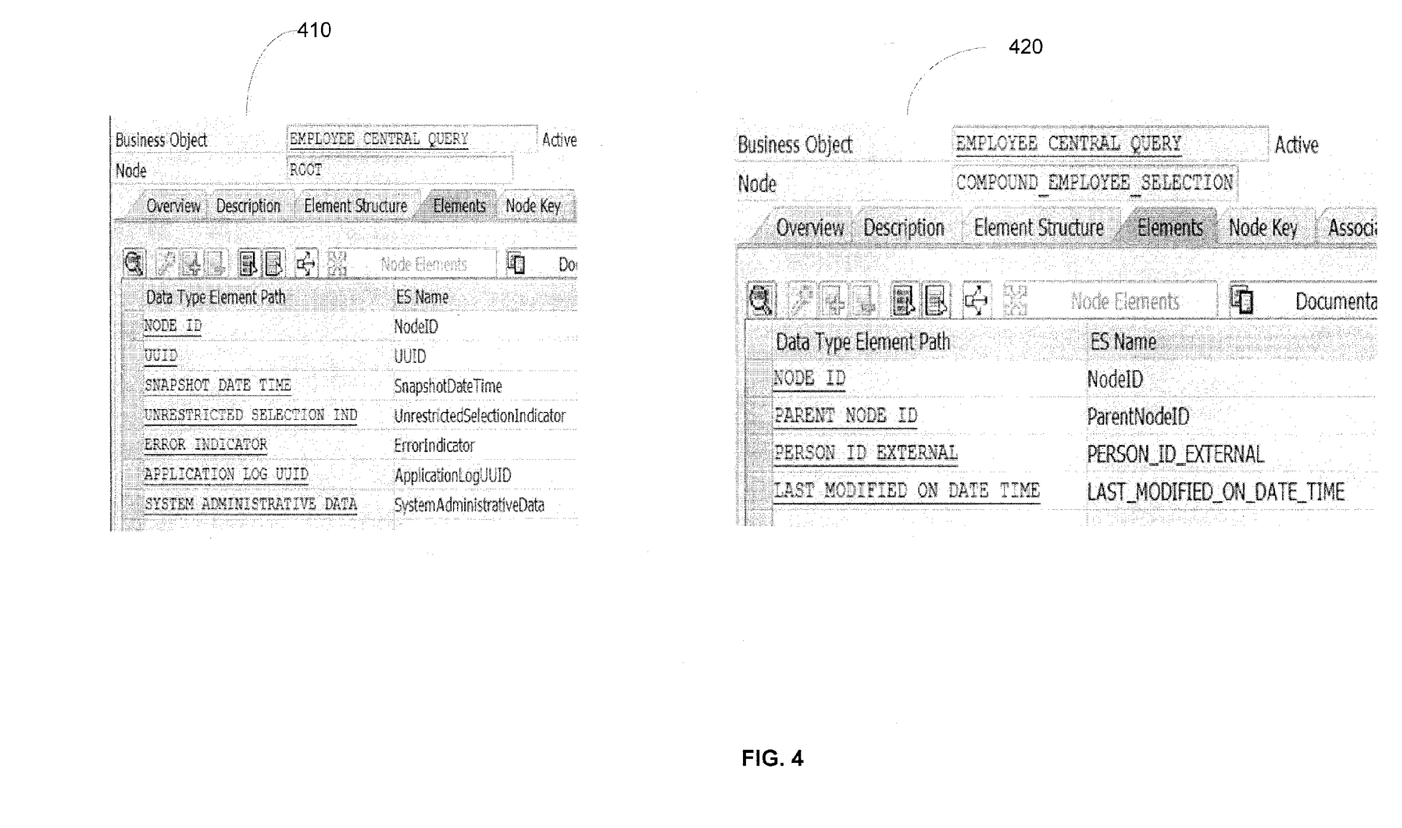
FIG. 4 depicts examples of models for pull request objects, in accordance with some example implementations.

FIG. 4 depicts an example model defining the pull business object. The root node 410 includes administrative data, such as a node identifier to identify the object itself, a snapshot date and time, and unrestricted field, an error indicator, an application log UUID (universally unique identifier) for a link between the administrative record and the application log, and a system log UUID for a unique identifier of that monitoring record, and a system administrative data for storing the user who has triggered the pull call.

Node 420 includes one or more selection criteria, such as a node identifier (Node ID) to identify the object itself, a parent node ID to associate node 420 to another node, such as a parent node or node 410, a selection criteria (which in this example is "PERSON_ID_EXTERNAL", although other criteria may be used as well based on use case), and a last modified on date and time value to allow the selection criteria, such "PERSON_ID_EXTERNAL," to be further limited based on the last modified on date and time value (for example, data for "PERSON_ID_EXTERNAL" on or after the last modified on date and time value).

Figure 5:
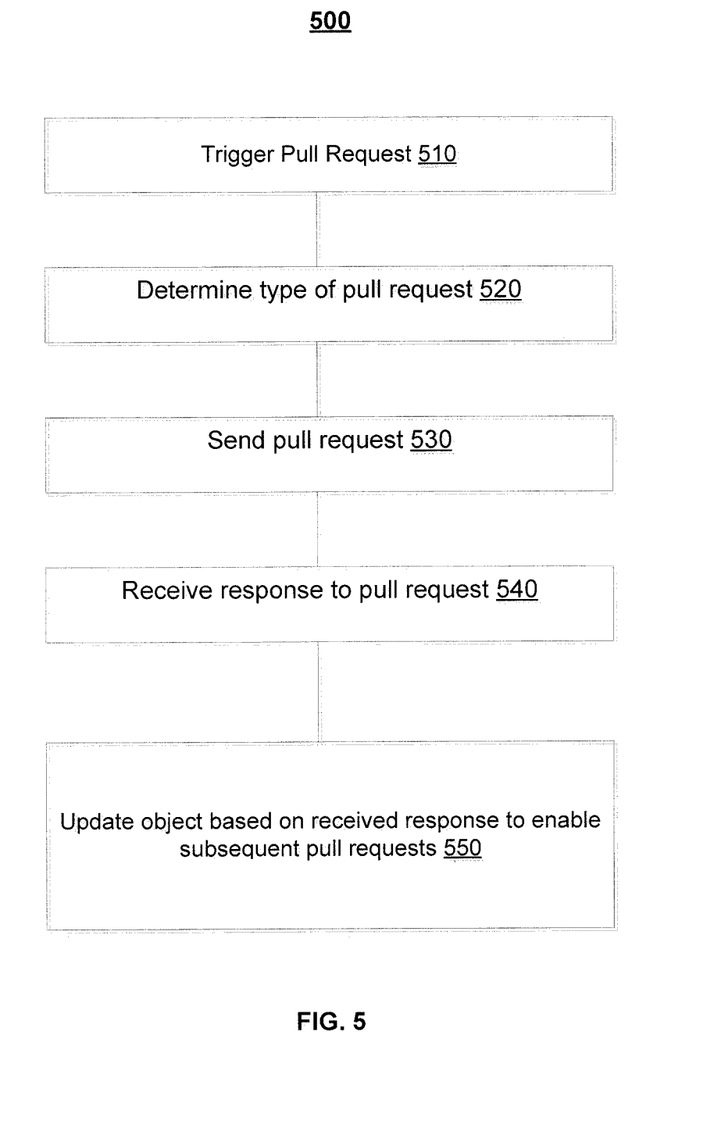
FIG. 5 depicts another example of a data pull process, in accordance with some example implementations.

FIG. 5 depicts an example process 500 for pulling data into a system, when another source system does not provide notifications to the system that updates are available. The description of FIG. 5 also refers to FIG. 1.

At 510, a pull request may be triggered. For example, pull controller 150 may trigger a pull request based on a schedule and or an event. For example, a schedule may define when a pull request should be triggered and thus generated by pull request. The pull call may also be initiated by a user as well by for example requesting the pull controller to send a pull request.

At 520, a determination may be made regarding whether a restricted and/or an unrestricted pull request are to be generated. For example, pull controller 150 may access the administrative node of business object 200 and determine the time of the last successful pull request and whether that pull request was unrestricted. If it was successful and unrestricted, the pull request may be generated as another unrestricted pull request to obtain data modified (for example, updated and the like) on or after the data and time timestamp value associated with the last successful, unrestricted pull request, as shown for example at 305. If it was not successful, the pull controller may search the business object for a successful pull request that was unrestricted, request a complete update of all of the data since that successful pull request and/or instead use specific selection criteria in the selection node of the business object, such as "employee ID."

At 530, the generated pull request may be sent. For example, pull controller 150 may make a call to system 105 to obtain the data from master data 112A, as noted above at 310. At 540, a response to the pull request may be received.

For example, any obtained data may be sent, as noted above at 325. If an error occurs at system 105, the response sent at 325 may indicate an error.

At 550, the business object may be updated based on the results of the pull request. For example, the snapshot time date and time value may be updated to reflect the last modified time of the data received at 325 and, if the data was obtained in an unrestricted pull request, the unrestricted field of the business object may also updated, and this information may be used by pull controller 150 in order to generate subsequent pull requests in accordance with process 500.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A computer-readable medium containing instructions to configure at least one processor to cause operations comprising:
   determining, based at least in part on an object, that a prior pull request is unsuccessful, wherein the prior pull request comprises an attempt to obtain, from a second processor, an update to data at a first processor, and wherein the second processor is associated with master data corresponding to the data at the first processor;
   generating a pull request, wherein the pull request comprises another attempt to obtain the update to the data at the first processor, wherein the generating of the pull request includes:
   accessing the object to determine whether the prior pull request is a restricted type or an unrestricted type,
   when the prior pull request is determined to be of the unrestricted type, including in the pull request a timestamp indicating a time of a last successful pull request, and
   when the prior pull request is determined to be of the restricted type, including in the pull request the timestamp and at least one selection criterion associated with the prior pull request, wherein the selection criterion restricts the update to a portion of the data at the first processor;
   sending, by the first processor, the pull request to the second processor; and
   receiving, in response to the pull request, the update to the data at the first processor.

2. The computer-readable medium of claim 1, wherein the master data is stored at a database, and wherein the second processor does not provide, to the first processor, notifications of when the master data is updated.

3. The computer-readable medium of claim 1, wherein the object includes status information for one or more prior pull requests, time information for one or more prior pull requests, error information for one or more prior pull requests, and query information to enable a query of the second processor having master data.

4. The computer-readable medium of claim 1, wherein the object includes an administrative node linked to a query node.

5. The computer-readable medium of claim 4, wherein the administrative node includes a time when the first processor was last updated successfully in accordance to the master data at the second processor, an indication of whether one or more prior pull requests failed, one or more unrestricted indicators, and one or more restricted indicators.

6. The computer-readable medium of claim 5, wherein at least one of the unrestricted indicators represents whether the prior pull request was configured to obtain all data from master data, and wherein at least one of the restricted indicators represents whether the prior pull request was configured to obtain a portion of the master data in accordance with the selection criterion comprising the query node.

7. The computer-readable medium of claim 1 further comprising: updating the object to include a timestamp corresponding to the pull request and an indication of whether the pull request is successful or unsuccessful.

8. The computer-readable medium of claim 1, wherein a pull controller comprising at least one processor circuitry and at least one memory circuitry causes the accessing, the generating, and the sending.

9. The computer-readable medium of claim 1, wherein the selection criterion comprises a query specifying a portion of the master data at the second processor, and wherein the portion of the data at the first processor is updated in accordance with the portion of the master data at the second processor.

10. The computer-readable medium of claim 1, wherein the update includes changes made to the master data since the time indicated by the timestamp.

11. A system comprising
at least one processor circuitry; and
at least one memory circuitry including computer program code, which when executed by the at least one processor circuitry causes operations comprising:
determining, based at least in part on an object, that a prior pull request is unsuccessful, wherein the prior pull request comprises an attempt to obtain, from a second processor, an update to data at a first processor, and wherein the second processor is associated with master data corresponding to the data at the first processor;
generating a pull request, wherein the pull request comprises another attempt to obtain the update to the data at the first processor, wherein the generating of the pull request includes:
accessing the object to determine whether the prior pull request is of a restricted type or an unrestricted type,
when the prior pull request is determined to be of the unrestricted type, including in the pull request a timestamp indicating a time of a last successful pull request, and
when the prior pull request is determined to be of the restricted type, including in the pull request the timestamp and at least one selection criterion associated with the prior pull request, wherein the selection criterion restricts the update to a portion of the data at the first processor;
sending, by the first processor, the pull request to the second processor; and
receiving, in response to the pull request, the update to the data at the first processor.

12. The system of claim 11, wherein the master data is stored at a database, and wherein the second processor does not provide, to the first processor, notifications of when the master data is updated.

13. The system of claim 11, wherein the object includes status information for one or more prior pull requests, time information for one or more prior pull requests, error information for one or more prior pull requests, and query information to enable a query of the second processor having master data.

14. The system of claim 11, wherein the object includes an administrative node linked to a query node.

15. The system of claim 14, wherein the administrative node includes a time when the first processor was last updated successfully in accordance to the master data at the second processor, an indication of whether one or more prior pull requests failed, one or more unrestricted indicators, and one or more restricted indicators.

16. The system of claim 15, wherein at least one of the unrestricted indicators represents whether the prior pull request was configured to obtain all data from master data, and wherein at least one of the restricted indicators represents whether the prior pull request was configured to obtain a portion of the master data in accordance with the selection criterion comprising the query node.

17. The system of claim 11 further comprising: updating the object to include a timestamp corresponding to the pull request and an indication of whether the pull request is successful or unsuccessful.

18. The system of claim 11 wherein a pull controller comprising at least one processor circuitry and at least one memory circuitry causes the accessing, the generating, and the sending.

19. The system of claim 11, wherein the selection criterion comprises a query specifying a portion of the master data at the second processor, and wherein the portion of the data at the first processor is updated in accordance with the portion of the master data at the second processor.

20. The system of claim 11, wherein the update includes changes made to the master data since the time indicated by the timestamp.

21. A method comprising:
determining, based at least in part on an object, that a prior pull request is unsuccessful, wherein the prior pull request comprises an attempt to obtain, from a second processor, an update to data at a first processor, and wherein the second processor is associated with master data corresponding to the data at the first processor;
generating a pull request, wherein the pull request comprises another attempt to obtain the update to the data at the first processor, wherein the generating of the pull request includes:
accessing the object to determine whether the prior pull request is of a restricted type or an unrestricted type,
when the prior pull request is determined to be of the unrestricted type, including in the pull request a timestamp indicating a time of a last successful pull request, and
when the prior pull request is determined to be of the restricted type, including in the pull request the timestamp and at least one selection criterion associated with the prior pull request, wherein the selection criterion restricts the update to a portion of the data at the first processor;
sending, by the first processor, the pull request to the second processor; and
receiving, in response to the pull request, the update to the data at the first processor.

22. The method of claim 21, wherein the master data is stored at a database, and wherein the second processor does not provide, to the first processor, notifications of when the master data is updated.

23. The method of claim 21, wherein the object includes status information for one or more prior pull requests, time information for one or more prior pull requests, error information for one or more prior pull requests, and query information to enable a query of the second processor having master data.

24. The method of claim 21, wherein the object includes an administrative node, wherein the administrative node includes a time when the first processor was last updated successfully in accordance to the master data at the second processor, an indication of whether one or more prior pull requests failed, one or more unrestricted indicators, and one or more restricted indicators.

25. The method of claim 21, wherein the selection criterion comprises a query specifying a portion of the master data at the second processor, and wherein the portion of the data at the first processor is updated in accordance with the portion of the master data at the second processor.

26. The method of claim 21, wherein the update includes changes made to the master data since the time indicated by the timestamp.

* * * * *